United States Patent [19]
van Oene et al.

[11] Patent Number: 5,820,808
[45] Date of Patent: Oct. 13, 1998

[54] ADDITIVE AND METHOD FOR IN SITU SURFACE MODIFICATION OF INJECTION MOLDED POLYMERS

[75] Inventors: Henk van Oene, Westland; Deborah F. Mielewski; Kevin R. J. Ellwood, both of Ann Arbor, all of Mich.

[73] Assignee: Ford Global Technologies, Inc., Dearborn, Mich.

[21] Appl. No.: 784,326

[22] Filed: Jan. 16, 1997

[51] Int. Cl.⁶ ............................ B29C 45/00; B29C 45/02; B29B 7/00

[52] U.S. Cl. ........................ 264/328.12; 264/328.14; 264/328.8; 264/328.15; 264/328.16; 264/331.11; 264/328.17

[58] Field of Search ............... 264/310, 328.12, 264/328.8, 40.6, 328.1, 328.16, 328.14, 328.15, 331.11

[56] References Cited

U.S. PATENT DOCUMENTS

| | | | |
|---|---|---|---|
| 4,477,608 | 10/1984 | Bäbler et al. | 523/215 |
| 4,483,955 | 11/1984 | Christiansen et al. | 524/293 |
| 4,830,779 | 5/1989 | Maeno et al. | 252/512 |
| 5,079,084 | 1/1992 | Kondo et al. | 428/324 |
| 5,143,963 | 9/1992 | Sterling et al. | 524/366 |
| 5,158,707 | 10/1992 | Vestberg et al. | 252/500 |
| 5,219,492 | 6/1993 | Österholm et al. | 252/500 |
| 5,281,363 | 1/1994 | Schacklette et al. | 252/500 |

*Primary Examiner*—Lora M. Green
*Assistant Examiner*—Joseph W. Ricigliano
*Attorney, Agent, or Firm*—Roger L. May; Joseph W. Malleck

[57] ABSTRACT

A method for forming an injection molded component from a host polymer (18) uses a very small quantity of an additive (32) that is efficiently driven to the surface of the component during the injection molding process. The additive exists in the host polymer at a very low concentration in the bulk, much lower than would be necessary to achieve the modification in a homogeneous blend. The additive is an insoluble liquid in the host polymer under the temperature and pressure conditions of injection molding. The additive is driven to the flow front surface (22) during injection molding and then translated to the surface (24) of the component by fountain flow and is distributed on the surface in a thin layer, producing the desired surface modification, without altering the properties of the bulk polymer, and eliminating post processing steps from the manufacturing process.

20 Claims, 2 Drawing Sheets

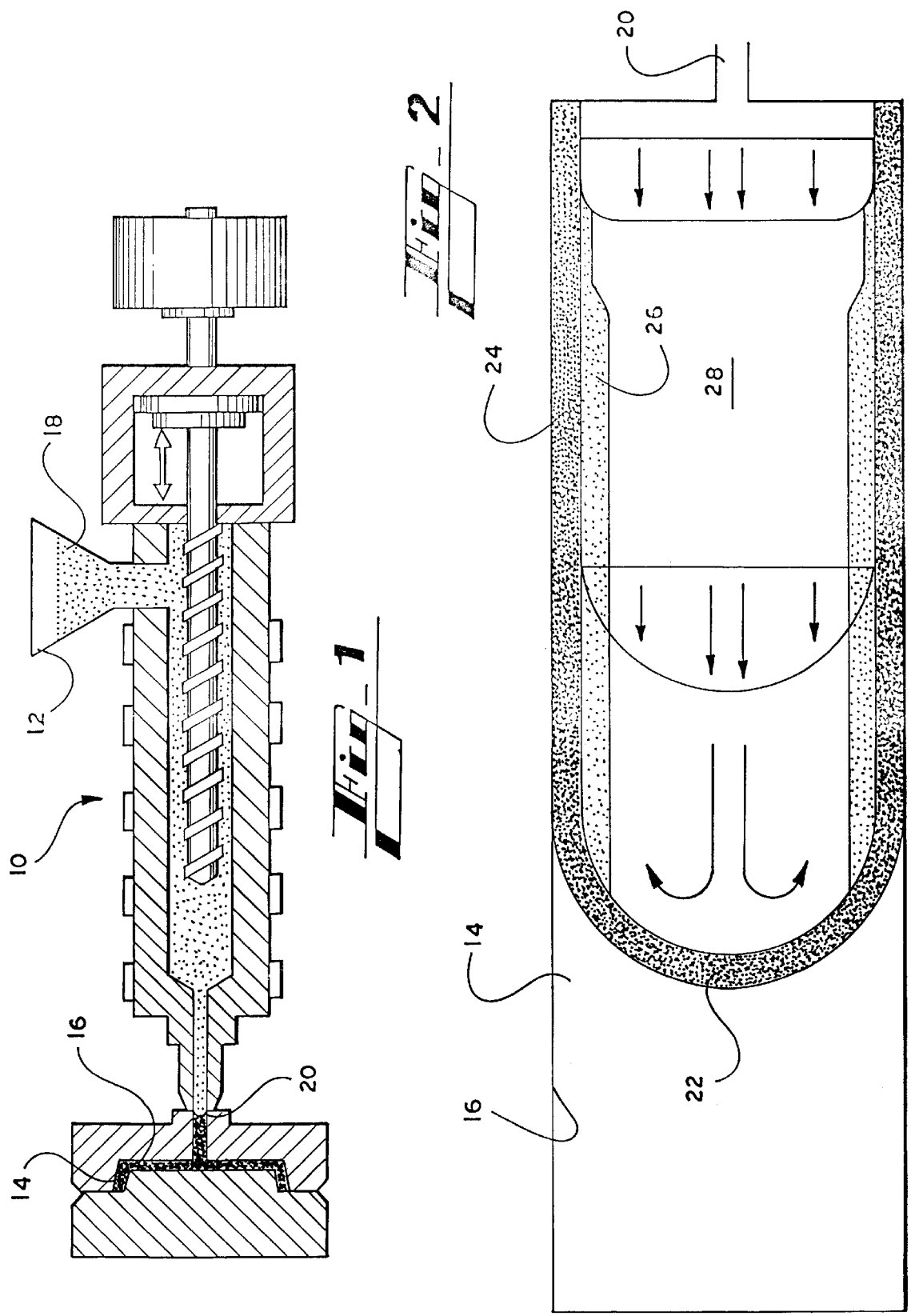

ADDITIVE AND METHOD FOR IN SITU SURFACE MODIFICATION OF INJECTION MOLDED POLYMERS

FIELD OF THE INVENTION

The present invention pertains to injection molding processes wherein additives are used to modify the surface properties of the molded polymers.

BACKGROUND OF THE INVENTION

In automobile manufacturing, a wide variety of plastic materials are used to construct a variety of components. Polypropylene is one widely used plastic material, others are rubber modified polypropylene, thermoplastic olefin, ABS, polyurethanes, polycarbonates, polyesters and polyethylenes. Plastic surfaces often require modification before post treatments such as painting. To promote adhesion of paint, it is sometimes necessary to coat a component with an adhesion promoter or to flame or plasma treat the component to incorporate chemical functional groups onto the surface to which the coating will adhere. Adhesion promoters are typically chlorinated or chlorinated/hydroxy polymers. The adhesion promoter usually contains a mixture of solvents and is applied as a separate step in a spray to the component creating solvent emissions thereby requiring a solvent recovery system which increases manufacturing costs. Transfer efficiencies for painting plastics are low (25%–40%) due to the inability to use electrostatic techniques. To improve transfer efficiencies during painting, carbon aggregate additives are mixed into the polymer resin at concentrations on the order of ten to twenty per cent. Unfortunately, these additives alter material properties of the bulk polymer making the finished component more brittle and susceptible to defects and failure. Deterioration of properties such as decreased tensile elongation, low temperature ductility and increased shrinkage have been observed along with processing problems such as increased melt viscosity. Accordingly, it will be appreciated that it would be highly desirable to produce a component without creating solvent emissions and without altering the bulk properties of the polymer while eliminating some steps, such as spray painting, plasma treating, etc., from the manufacturing process.

Another problem with injection molded components is that weld lines occur along which a component is weakened and is susceptible to failure. Weld lines occur when two polymer flow fronts meet during mold filling due to either multi-gated molds, splitting and rejoining of flow around inserts or sudden changes in mold wall thickness. It has been discovered that a major cause of weakness in weld lines is the accumulation of insoluble additives on the flow front tip during the process of filling the mold. Even though very small quantities of some additives (0.1%–0.5% by weight) are added to the bulk polymer, and are homogeneously dispersed initially, they accumulate at the flow front during the filling process and are trapped at the weld line when two flow fronts meet. The additive then hinders strength development by diffusion between the polymer on each side of the weld line. The weakness of plastics at weld lines provides serious difficulties for both design and long term durability of injection molded components. Accordingly, it will be appreciated that it would be highly desirable to have a process that produces a component with increased weld line strength.

SUMMARY OF THE INVENTION

The present invention is directed to overcoming one or more of the problems set forth above. Briefly summarized, according to one aspect of the present invention, a method for in situ surface modification of an injection molded component, comprising the steps of: setting up a mold having a cavity with a surface; injecting a mixture containing a host polymer and an additive at a very low concentration, much lower than concentrations necessary to modify properties of the bulk polymer into the mold cavity; driving the additive to the surface of the cavity using the fountain flow phenomenon; and quenching the mixture in the cavity and producing the molded component having the additive concentrated on the surface of the molded component.

The low concentration, insoluble liquid additive is initially homogeneously dispersed within the host polymer matrix and forms discrete droplets. During the mold filling process, the fluid experiences laminar type flow. Near the advancing flow front, the motion of extensional/stretching flow aids the droplets in emerging and segregating on the flow front surface. The additive is then deposited onto the surface of the component by fountain flow. The additive molecules are frozen rapidly by cooling as soon as the melt touches the cold mold wall, and a component is produced that is surface modified by the additive of choice. The injection molding process is usually carried out at temperatures in the 300° F. to 700° F. range and at pressures in the range of 500 psi to 40,000 psi at which the polymer is a high viscosity liquid. The additive must be a liquid and insoluble or at least partially insoluble in the host polymer under the temperature and pressure conditions of injection molding and is forced to the surface and concentrated there.

According to another aspect of the invention, an injection molding mixture comprises a host polymer and an additive material whose addition is intended to improve some property of the polymer. The guest material is mixed with the host polymer at concentrations in a range of 0.1 to about 5.0 per cent by weight. The guest material is a substantially insoluble liquid in the host polymer under temperature and pressure conditions of injection molding.

The insoluble guest material is forced to the flow front during injection molding and homogeneously dispersed throughout the surface of the molded article. In addition, it is trapped at the weld line when two flow fronts meet, hindering strength development between the polymer on each side of the weld line. When a weld line forms, the additive material trapped there will be responsible for a large portion of the decrease in strength. Weld line strength is improved under these conditions by adding a second guest material, at low concentration, that is partially compatible with both the host polymer and additive that is known to concentrate at the flow front. Compatibilizers for polymer blends improve strength between phases in a similar fashion. The second guest material which is also insoluble and will form discrete droplets will also be forced to the flow front during injection molding and will position itself, due to thermodynamic conditions of minimal energy, between the two incompatible materials tying them together and thereby increasing strength at the weld line.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 1 a simplified cross-sectional diagram of an injection molding machine.

FIG. 2 is a diagram illustrating the flow front of a mixture introduced into the mold cavity of the molding machine of FIG. 1.

DETAILED DESCRIPTION OF THE PREFERRED EMBODIMENTS

Figure 3:
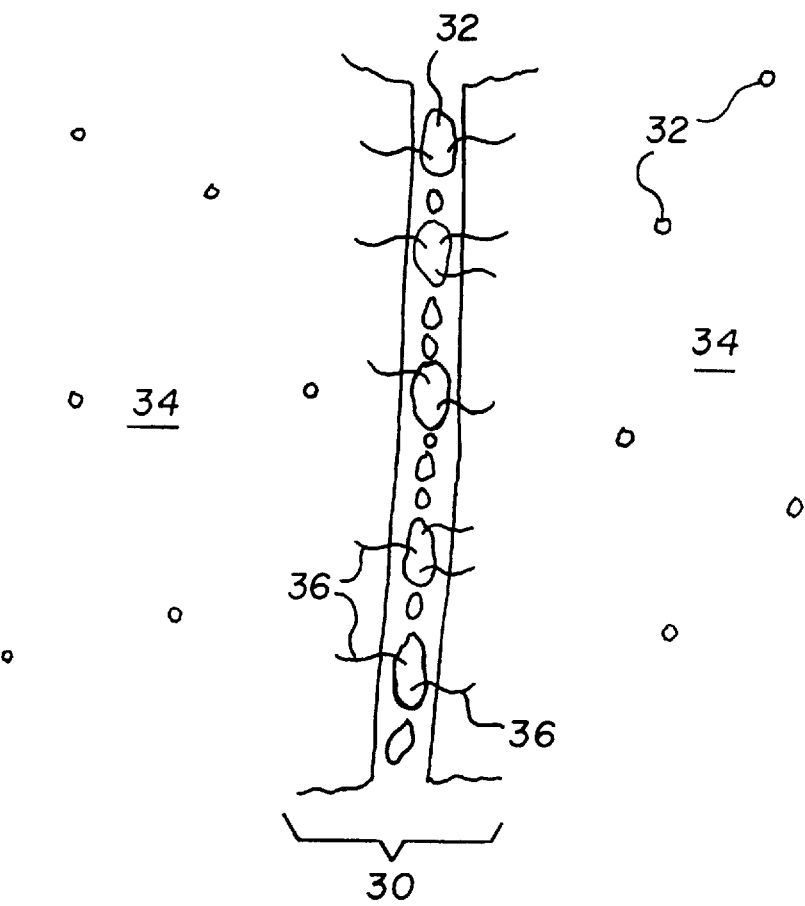
FIG. 3 is a diagram showing additivies at a weld line.

Referring to FIGS. 1 and 2, an injection molding machine 10 has hopper 12 and contains a mold with a mold cavity 14. The cavity 14 has a surface 16 to produce an article of desired configuration. Material 18, such as polypropylene for example, is fed from the hopper 12 through one or more gates 20 to the cavity 14.

Where the material is predominantly polypropylene, it is heated to a temperature in the range of about 350° F. to 550° F. and liquefied before entering the cavity under pressure in the range of about 10,000 psi to 20,000 psi. At temperatures outside of the range, the viscosity is so low or so high that it affects the ability to process or material properties of the component. At lower temperatures, the material viscosity is too high, and the material cannot be pushed into the mold. At higher temperatures, the material degrades during processing and leaks out of the mold producing 'flash' that must be hand trimmed off the component. At pressures outside of the range, the pressure is so low or so high that either flash or short shots (incomplete filling of the mold) occur.

During filling of the cavity with the material, the mold surface is kept at a temperature of about 70° F. to quench the melt when it hits the wall forming the desired article. Quench temperatures lower than about 70° F. will increase shear stress between the flow layers and cause incomplete filling of the mold, and temperatures higher than about 70° F. increase production time. Where the article is an automotive vehicle component normally requiring post treatment such as painting, the surface of the component can be altered during molding to more readily accept paint by introducing an insoluble additive at very low concentration to the mixture using the elongational flow near the flow front to aid the additive droplets in emerging and concentrating at the flow front, and using the fountain flow phenomenon to deposit the additive onto the surface of the component during mold filling.

The additive must be an insoluble or very nearly insoluble liquid in the host polypropylene under the temperature and pressure conditions of injection molding. Only the insoluble portion of the additive will remain as distinct liquid droplets, and will be available to be deposited on the surface of the component. Even if the polypropyene and additive are solid in the hopper, they liquefy before passing through the gate to the mold cavity.

FIG. 2 shows the melt pattern entering the mold cavity 14 from the injection molding machine 10 wherein a fountain stretching effect results as indicated by the arrows. The boundary between the polymer melt 18 advancing from the gate 20 and the still-empty portion of the cavity 14 is the melt front 22. The melt front 22 is a stretching membrane of polymer that rolls out like a bulldozer tread onto the surface 16 of the relatively cold mold 14 creating a zone or layer of surface orientation. The stretching melt front 22 covers the inside surface wall 16 of the mold cavity 14. Behind the melt front more polymer flows to maintain the advancing melt front. In this zone, orientation is caused by shearing of one polymer layer over another as a consequence of the velocity difference resulting from the center line of the flow front flowing faster than the edges. The shearing flow creates another zone 26 of high orientation just under the surface layer 24 that came from the stretching front 22. One edge of this layer is hung up on the frozen surface layer while the other edge tries to go along with the main flow. The core 28 of the part is also oriented to some degree due to shearing and velocity gradations. At the centerline the orientation diminishes to nothing. The mold cavity fountain flow thus establishes surface 24, subsurface 26, and core 28 layers of orientation.

Weld lines can be formed by the rejoining or colliding of two melt layers or streams and are typically weaker than nonweld areas. Orientation in the weld area is at right angles to the principle flow direction and comes from the elongational stretching of the melt front. Conventional injection molding processes cause insoluble liquid additives to conjugate along weld lines causing the cured polymer to be nonhomogeneous with discontinuities in the weld area.

Weld lines act as stress concentrators and are undesirable where material strength is important.

FIG. 3 shows a weld line 30 formed about a first insoluble additive 32 between two areas of the bulk polymer 34. The addition of the second additive 36 improves the weld line 30 by acting as a graft polymer between the bulk polymer 34 and the first additive 32. The second additive 36 is partially compatible with the bulk polymer and first additive to bind them together, strengthening the weld line.

It will be now appreciated that there has been presented an injection molding mixture containing a host polymer and an insoluble liquid additive at a concentration of 0.1 to 5.0 per cent by weight. The additive flows to the mold cavity surface during injection to impart desired properties. The mixture is used in an injection molding process for in situ surface modification of an injection molded component. The method includes setting up a mold having a hopper and a cavity with a surface; adding a mixture to the hopper containing a host polymer and an additive at a concentration of about 0.1 to 5.0 per cent by weight; injecting the mixture into the cavity; accumulating the insoluble droplets on the flow front surface as a result of stretching motion near the flow front; driving the additive to the surface of the cavity using fountain flow; and quenching the mixture in the cavity and producing the molded component having the additive distributed at high concentration throughout the surface of the molded component without altering bulk properties of the polymer. The particular additive, in low concentrations, is selected to impart desired surface properties. For example, waxes in thermoplastics and metallic stearates in polymers such as polyolefins, ABS, polystyrene, etc. act as lubricants to reduce stress at the surface of injection molded components. Antistatic agents, such as glycerol esters and amines, reduce charge build up on injection molded components. Anthraquinones can be used as colorants/dyes to enhance appearance or eliminate painting of injection molded components. Another use is the addition of a low concentration of another polymer that will form an impermeable barrier layer at the surface of injection molded components, for example, polyvinylidene as a layer on top of polyethylene.

The invention can be used in an injection molding process for improving weld line strength in an injection molded component. The process includes setting up a mold having a hopper and a cavity with surfaces, and introducing a mixture containing a host polymer and an additive which imparts desirable properties to the bulk polymer (such as heat stabilization) at a concentration of 0.1 to about 5.0 per cent by weight with the additive being a substantially insoluble liquid in the host polymer under temperature and pressure conditions of injection molding. The mixture is introduced knowing that the insoluble additive will accumulate at the flow front due to the extensional flow at the advancing front making the weld line weak. The process includes adding a second guest material at low concentration that is compatibilizer-like in nature between and host polymer and the first additive; injecting the mixture into the cavity; driving the additive to the flow front surface; and quenching the mixture in the cavity. This produces the molded component having the second additive positioned between the two incompatible materials, the bulk polymer and first additive, and improves strength at the weld line.

Operation of the present invention is believed to be apparent from the foregoing description and drawings, but a few words will be added for emphasis An article is chosen for injection molding dictating which plastic material is suitable for its manufacture, and the temperature and pressure required. An additive is chosen based upon the particular surface characteristics desired. The two components can be mixed together using any standard mixing process such as extrusion or Banbury type mixers. They can be either pelletized or shredded for acceptance by injection molding machines. The polymer with additive is loaded in the hopper of the injection machine where they are mixed and heated.

The heated mixture is forced through the gate of the mold into the mold cavity. The stretching melt front covers the inside surface wall of the mold cavity by fountain flow. Melt that follows basically fills within the fountain flow. The result is a nonuniform orientation in the cross section of the molded part. There are three zones of melt. The first zone is a highly oriented frozen outer surface layed down from the extensionally deformed melt front, the second zone is a subsurface orientation from shear below the surface layer, and the third zone 28 is the core orientation area. The additive droplets segregate to the flow front as a result of the stretching motion aiding the droplet and is dispersed by fountain flow in enhanced concentration on the outer surface layer giving the outer surface the characteristics required for painting or other finishing without requiring post molding treatment.

While the invention has been described with particular reference to a preferred embodiment, it will be understood by those skilled in the art that various changes may be made and equivalents may be substituted for elements of the preferred embodiment without departing from invention. For example, while an injection molding machine has been described with a hopper, there are machines that receive the mixture by direct feed and other means so that a formal hopper is not required. In addition, many modifications may be made to adapt a particular situation and material to a teaching of the invention without departing from the essential teachings of the present invention. For example, synthetic resins other than ABS and polypropylene can be used for injection molded components and are selected according to their chemical and mechanical properties.

As is evident from the foregoing description, certain aspects of the invention are not limited to the particular details of the examples illustrated, and it is therefore contemplated that other modifications and applications will occur to those skilled in the art. For example, surface properties of a component such as conductivity, adhesion promotion, gloss, color, toughness or mold release can be modified by an additive. While additives at very low concentrations (0.1% to 0.5%) have been described, the invention may be very useful at concentrations of up to 5 per cent or even 10 per cent. To modify the bulk properties of certain polymers, especially one component, amorphous polymers, it may be necessary to add concentrations of additives in the range of 20 per cent to 40 per cent. It is accordingly intended that the claims shall cover all such modifications and applications as do not depart from the true spirit and scope of the invention.

What is claimed is:

1. A method for in situ surface modification of an injection molded component, comprising the steps of:

setting up a mold having a hopper and a cavity with a surface;

adding a mixture to said hopper, said mixture containing a host polymer and polyaniline in a polymeric carrier, wherein polymeric carrier is an insoluble additive that forms, droplets of said insoluble additive in the bulk polymer, said insoluble additive being at a concentration lower than necessary to modify properties of the bulk polymer;

injecting said mixture into said cavity and creating a polymer flow front;

stretching and advancing the flow front causing droplets of said insoluble additive to emerge on the flow front;

driving said insoluble additive to said surface of said cavity using fountain flow; and quenching said mixture in said cavity and producing said molded component having said insoluble additive in enhanced concentration throughout the surface of said molded component.

2. The method of claim 1 wherein the injecting step further comprises raising said mixture to a temperature between about 300° F. and 700° F.

3. The method of claim 1 wherein the injecting step further comprises increasing pressure on said mixture to a pressure between about 500 psi and 40,000 psi.

4. The method of claim 1 wherein the injecting step further comprises liquefying said mixture under suitable temperature and pressure conditions of injection molding.

5. The method of claim 1 wherein the step of quenching further comprises bringing said mixture to a temperature of about 70° F.

6. The method of claim 1 wherein said host polymer is polypropylene.

7. A method for improving weld line strength in an injection molded component, comprising the steps of:

setting up a mold having a hopper and a cavity with surfaces;

introducing a mixture containing a host polymer and a first additive at a low concentration of 0.1 to about 0.5 per cent by weight into said hopper, said first additive being a substantially insoluble liquid in said host polymer under suitable temperature and pressure conditions of injection molding;

introducing a second additive into said mixture at a low concentration that is a compatibilizer between the host polymer and the first additive;

injecting said mixture into said cavity and creating a polymer flow front, said additives concentrating at the flow front due to extensional flow at the advancing front making the weld line weak;

driving said additives to the flow front surface; and quenching said mixture in said cavity and producing said molded component having said second additive positioned between the bulk polymer and first additive improving weld line strength.

8. The method of claim 7 wherein the step of driving said additive to the surface includes translating accumulated additive to the surface using fountain flow phenomenon.

9. The method of claim 7 wherein the injecting step further comprises raising said mixture to a temperature between about 300° F. and 700° F.

10. The method of claim 7 wherein the injecting step further comprises increasing pressure on said mixture to a pressure between about 500 psi and 40,000 psi.

11. The method of claim 7 whereing the step of quenching further comprises bringing said mixture to a temperature of about 70° F.

12. The method of claim 7 wherein said host polymer is polypropylene.

13. The method of claim 7 wherein said second additive is polyaniline in a polymeric carrier.

14. The method of claim 7 wherein said second additive is thiosulfate.

15. A method for in situ surface modification of an injection molded component, comprising the steps of:

setting up a mold having a hopper and a cavity with a surface;

adding a mixture to said hopper, said mixture containing a host polymer and thiosulfate heat stabilizer which is an insoluble additive that forms, droplets of said insoluble additive in the bulk polymer, said insoluble additive being at a concentration lower than necessary to modify properties of the bulk polymer;

injecting said mixture into said cavity and creating a polymer flow front;

stretching and advancing the flow front causing droplets of said insoluble additive to emerge on the flow front;

driving said insoluble additive to said surface of said cavity using fountain flow; and quenching said mixture in said cavity and producing said molded component having said soluble additive in enhanced concentration throughout the surface of said molded component.

16. The method of claim 15 wherein the injecting step further comprises raising said mixture to a temperature between about 300° F. and 700° F.

17. The method of claim 15 wherein the injecting step further comprises increasing pressure on said mixture to a pressure between about 500 psi and 40,000 psi.

18. The method of claim 15 wherein the injecting step further comprises liquefying said mixture under suitable temperature and pressure conditions of injection molding.

19. The method of claim 15 wherein the step of quenching further comprises bringing said mixture to a temperature of about 70° F.

20. The method of claim 15 wherein said host polymer is polypropylene.

* * * * *